June 14, 1938.  W. F. OLIVER  2,120,676
HYDRAULIC BRAKE
Filed March 17, 1932  2 Sheets-Sheet 2

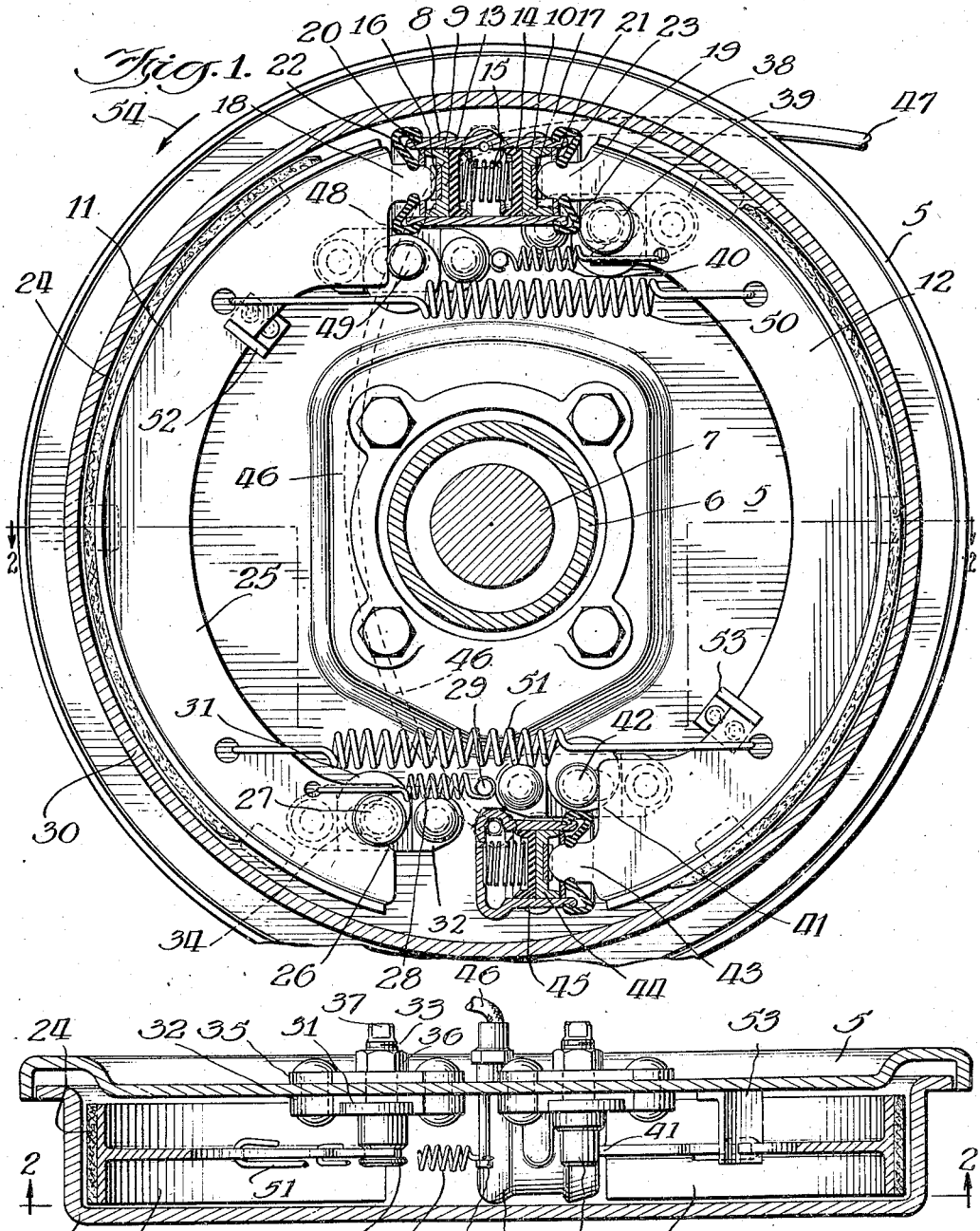

Inventor:
Wallace F. Oliver
By Williams, Bradbury,
McCaleb & Hinkle
Attys.

Patented June 14, 1938

2,120,676

UNITED STATES PATENT OFFICE 2,120,676

HYDRAULIC BRAKE

Wallace F. Oliver, Detroit, Mich., assignor to Hydraulic Brake Company, Detroit, Mich., a corporation of California Application March 17, 1932, Serial No. 599,479

15 Claims. (Cl. 188—152)

My invention pertains to hydraulic brakes and is particularly adapted for use in connection with automotive vehicles although it is also applicable to other uses.

The present tendency in the automotive field is to increase the speed and weight of automotive vehicles, which requires more powerful and fully equalized brakes.

An object of my invention is to materially increase the efficiency and effectiveness of a hydraulic brake while still maintaining perfect equalization of the braking effort on the several wheels of the vehicle.

Another object is to provide a hydraulic brake which will give increased braking effort without requiring vacuum boosters or other power-operated mechanism.

Another object is to provide a hydraulic brake which will give materially increased braking effort to retard or prevent forward motion of the vehicle, and which will also give adequate braking effort to retard or prevent backward movement of the vehicle.

Another object is to provide simple, sturdy and inexpensive mechanism for accomplishing the above-described objects.

Other objects and advantages will become apparent as the description proceeds.

In the drawings,

Fig. 1 is a vertical section through the braking mechanism at the vehicle wheel and illustrates one embodiment of my invention, this figure being taken on the line 1—1 of Fig. 2;

Fig. 2 is a section taken on the line 2—2 of Fig. 1;

Figure 4:
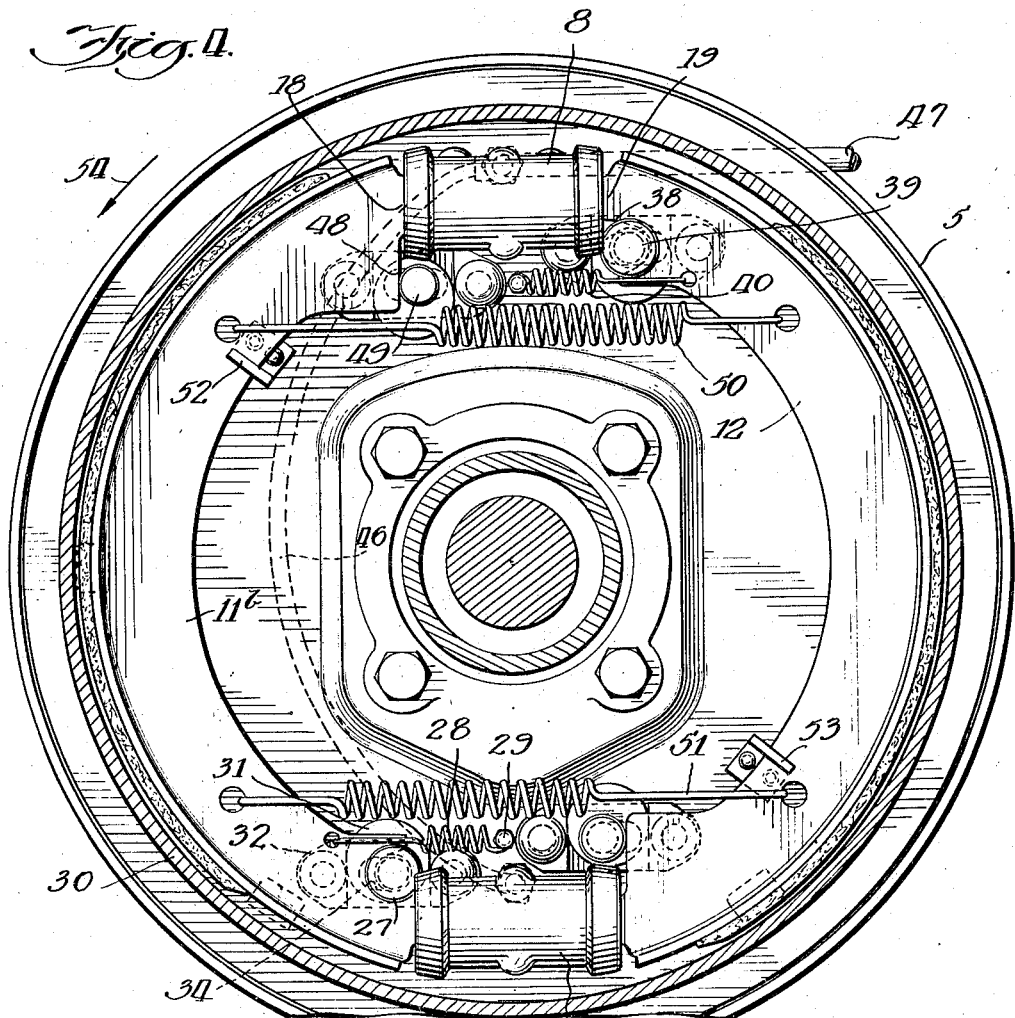
Fig. 4 is a view similar to Fig. 1 but showing a modified form of my invention in which both shoes act as leading shoes on both forward and reverse movement of the vehicle.

In Figs. 1 and 2 of the drawings I have shown a brake pan 5 rigidly attached to the housing 6 of the rear axle 7 of an automotive vehicle. A double ended hydraulic cylinder 8 is bolted or otherwise suitably secured to the pan 5 and has opposed pistons 9 and 10 which engage the adjacent ends of brake shoes 11 and 12, respectively. The pistons 9 and 10 are provided with cup-shaped washers 13 and 14 which are held against their respective pistons by an interposed spring 15. The cylinder is made of such length that there is considerable space between the inturned flanges of the cup washers 13 and 14 even when the brake shoes are in their retracted positions.

The pistons 9 and 10 are provided with suitable wear plates 16 and 17 for engaging the ends 18 and 19 of the brake shoes 11 and 12. Guiding washers 20 and 21 are provided to center the ends 18 and 19 of the brake shoes and to maintain them in proper registration with the wear plates 16 and 17. The ends of the cylinder are closed against dirt and moisture by flexible boots 22 and 23.

The brake shoe 11 is T-shaped in cross section, having an arcuate outer surface to which is attached a brake lining 24 and a radial flange 25 having a notch 26 which is normally held in contact with the grooved end of an anchor pin 27 by a spring 28. One end of the spring 28 engages the brake shoe 11 and the other end of this spring is connected to a pin 29 attached to the pan 5.

The anchor pin 27 is adjustable to position the adjacent end of the brake shoe 11 closer to or farther from the flange of the brake drum 30. For this purpose the anchor pin 27 is provided with a circular flange 31 which is eccentric with respect to the grooved end of the pin. This circular flange 31 is located in a suitable vertical slot formed in a plate 32 riveted to the pan 5.

The anchor pin 27 has a threaded portion 33 which projects through a horizontal slot 34 formed in plate 32, pan 5, and also in supporting plate 35, and the anchor pin is locked in any desired position by nut 36. The end 37 of the anchor pin is made square so that the anchor pin can be held in adjusted position while the nut 36 is being tightened.

The particular adjustable anchor pin which has just been described is the invention of Erwin F. Loweke and is claimed in his application, Serial No. 600,846, filed March 24, 1932, and, while I prefer to use this particular type of adjustable anchor pin, any other suitable adjustable anchor pin may be used.

The brake shoe 12 is provided with a similar notch 38 which is held in engagement with the grooved head of a similar anchor pin 39 by a spring 40. The opposite end of this brake shoe 12 is provided with a shoulder 41 which normally rests against the cylindrical end of an adjustable anchor pin 42 which in all essential respects is similar to the anchor pin 27 except that the part which engages the brake shoe is not provided with a groove. This end of brake shoe 12 is further provided with an extension 43 which engages the piston 44 of a single acting hydraulic cylinder 45 which is attached to the pan 5 and which is connected with the cylinder 8 by a conduit 46.

Both cylinders 8 and 45 are supplied with fluid through a conduit 47 which leads to a suitable master cylinder and operating means therefor. The master cylinder and operating means may be of the type disclosed and claimed in Loughead and Loweke Patent No. 1,758,671.

The brake shoe 11 is also provided with a shoulder 48 which is normally in engagement with an adjustable stop 49. For convenience, I have shown this adjustable stop 49 as being identical with the adjustable anchor pin 42, but since this stop merely holds the brake shoe against the tension of the retractile springs, it is obvious that this stop can be made much lighter than the anchor pins, if so desired.

The brake shoes 11 and 12 are normally maintained in retracted position by retractile springs 50 and 51. The brake shoes are also provided with guides 52 and 53 which maintain the brake shoes in proper relation to the brake pan 5. The direction of rotation of the brake drum during forward movement of the vehicle is indicated by the arrow 54.

The pins 39 and 27 are preferably located at a greater distance from the center of the drum than are the pins 42 and 49. In this way more effective braking is obtained in movement in the forward direction.

The operation of my invention is as follows:

If the brake be applied while the vehicle is traveling in the forward direction, i. e., while the drum is rotating in the direction of the arrow 54 of Fig. 1, a fluid pressure will be built up in the cylinders 8 and 45. The pressure in the cylinder 8 will cause movement of the piston 9 to the left, as viewed in Fig. 1, and will cause brake shoe 11 to pivot about its anchor pin 27 and move into engagement with the brake drum 30. During forward movement of the vehicle the brake shoe 11 is a leading shoe, that is, the rotation of the drum is from the toe of the shoe to the anchored heel of the shoe, and thus a wrapping effect is produced between the brake shoe and the drum which greatly enhances the braking effect produced by this shoe.

The pressure built up in the cylinders 8 and 45 also acts on the pistons 10 and 44 and tends to produce movement of such pistons. The piston 10 has to overcome the tension of both springs 40 and 50, whereas the piston 44 only has to overcome the tension of spring 51, with the result that one end of the brake shoe 12 is held firmly in engagement with the anchor pin 39 while the piston 44 moves the opposite end of the brake shoe into engagement with the brake drum.

As soon as the brake shoe comes into engagement with the brake drum the movement of the brake drum tends to carry the brake shoe with it and the brake shoe is forcefully held in engagement with the anchor pin 39. The action of this brake shoe on a forward application of the brakes is the same as though the brake shoe were simply pivoted about the anchor pin 39, and the piston 10 has no function during an application of the brakes while the vehicle is moving in the forward direction. The piston 10, however, must be capable of a slight inward movement beyond normal position to accommodate the pivotal movement of brake shoe 12 about anchor pin 39.

Since the brake shoe pivots about anchor pin 39 and receives its applying force from cylinder 45, this brake shoe is also a leading shoe during forward movement of the vehicle, and its braking action is greatly augmented by the wrapping effect between the shoe and the brake drum. Therefore, during forward movement of the vehicle I have two leading shoes. Each shoe has its heel supported by a rigid anchor about which it pivots and its toe acted upon solely by the hydraulic pistons which are inherently equalized in all of the cylinders at the vehicle wheels. This results in a brake which provides tremendously increased power and which still maintains the perfect equalization which is so essential for the safe braking of vehicles when traveling at high speeds.

When the vehicle is traveling in the backward direction and the brakes are applied, the brake shoe 11 pivots about the adjustable anchor pin 27 under the action of the piston 9 and into engagement with the brake drum the same as it did when the brakes were applied while the vehicle was traveling in the forward direction. When the vehicle is in reverse, however, the brake shoe 11 becomes a trailing shoe and is much less effective in checking the motion of the vehicle.

The pressure in the cylinders 8 and 45 acts with equal force on the pistons 10 and 44 and again piston 44 acts first since it has to overcome only the one spring 51, whereas the piston 10 is opposed by springs 40 and 50. Therefore the brake shoe 12 is swung about anchor pin 39 by piston 44 until it engages the brake drum.

As soon as the shoe 12 engages the brake drum, the tendency is for the shoe to travel with the brake drum, and since the shoe is a floating shoe which is not fastened to anchor pin 39, the shoe travels with the brake drum until shoulder 41 abuts anchor pin 42, whereupon piston 44 becomes inactive and the brake shoe 12 pivots about anchor pin 42 under the action of piston 10. The brake shoe 12 thus acts as a leading shoe during both forward and reverse movements of the vehicle. During reverse movement of the vehicle my invention provides one leading shoe and one trailing shoe which gives ample braking, since automotive vehicles are never operated at high speeds in the backward direction.

Figure 3:
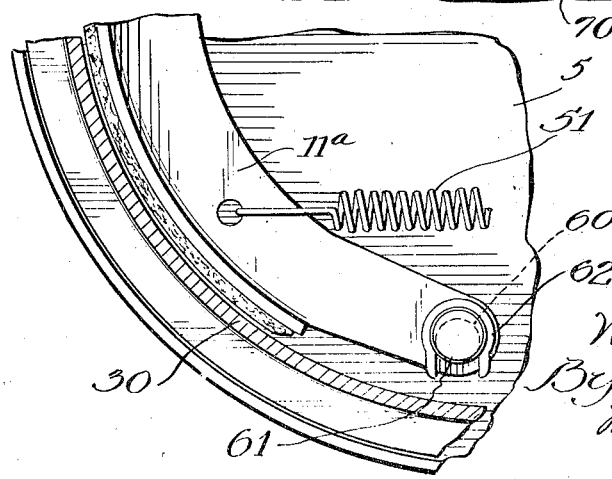
Fig. 3 is a fragmentary view showing a modified form of anchor for the single acting shoe shown in Figs. 1 and 2.

In Fig. 3 I have shown a shoe 11a, which corresponds to the shoe 11 of Fig. 1, as having the usual type of mounting consisting of a cylindrical opening 60 which receives any suitable type of adjustable eccentric anchor pin 61. A resilient C-shaped washer 62 holds the shoe 11a from sliding off the eccentric anchor 61.

In Fig. 4 I have shown a further embodiment of my invention in which both of the brake shoes are leading shoes on both forward and rearward movement of the vehicle. This embodiment is identical with the embodiment shown in Figs. 1 and 2 except that the single ended cylinder 45 has been replaced by a double ended cylinder 70 which is identical with the cylinder 8, and the brake shoe has been replaced by a brake shoe 11b which is identical and interchangeable with the brake shoe 12. In this embodiment of Fig. 4 the brake shoe 11b pivots about the anchor pin 27 when the brakes are applied while the vehicle is traveling in a forward direction, and about the pin 49 when the vehicle is traveling in a backward direction. In other words, the mode of operation of the brake shoe 11b is similar to the mode of operation of the brake shoe 12.

An important feature of my invention is the location of the anchor pins for the brake shoes outside of the hydraulic cylinders. This permits the anchor pins to be spaced a greater distance radially inward from the brake drum and affords more efficient and effective braking.

While I have illustrated and described three embodiments of my invention, it is to be understood that my invention is capable of numerous adaptations and that the scope of my invention is limited solely by the following claims.

I claim:

1. In mechanism of the class described, the combination of a rotatable brake drum, a stationary support, a cylinder carried by said support, a pair of brake shoes, a piston in said cylinder for each of said shoes, a second cylinder, a piston in said second cylinder for one of said shoes, and an anchor at each end of said last-mentioned shoe spaced different distances from the center of said drum.

2. In mechanism of the class described, the combination of a support, a double ended cylinder mounted on said support, a pair of pistons in said cylinder, a pair of brake shoes adapted to be moved into engagement with said drum by said pistons, anchors for the ends of said brake shoes opposite said cylinder, a second cylinder mounted on said support, said second cylinder having a single piston therein, said piston engaging one of said shoes, a second anchor for said last-mentioned shoe, said last-mentioned shoe forming a separable connection with both of its anchors, and spring means for holding said last-mentioned shoe against said anchors.

3. In mechanism of the class described, the combination of a brake drum having a flange, a support, a brake shoe adapted to engage said drum flange, a cylinder mounted on said support, a piston in said cylinder engaging one end of said shoe, said end having a notch adapted to receive an anchor, an anchor adjustably mounted on said support, said anchor spaced from said drum flange a distance greater than the distance between said drum flange and the axis of said cylinder, spring means for holding the notched part of said shoe against said anchor, means for pivoting said shoe about said anchor, and a second anchor about which said shoe pivots under the influence of said piston.

4. In mechanism of the class described, the combination of a rotatable brake drum, a brake shoe adapted to engage said drum, adjustable anchors for said shoe, one of said anchors receiving the thrust of said shoe when said drum is rotated in one direction and another of said anchors receiving the thrust of said shoe when said drum is rotated in the opposite direction, said brake shoe having a notch at one end adapted to engage one of said anchors and a shoulder at its opposite end adapted to engage another of said anchors, and actuators for swinging said shoe about said anchors, said shoe having portions other than said notch and shoulder for engagement by said actuators.

5. In mechanism of the class described, the combination of a brake drum, a support, a brake shoe adapted for engagement with said brake drum, a pair of rigid anchors for said brake shoe located at opposite ends thereof, the effective portion of one of said anchors being closer to the center of the brake drum than the effective portion of the other anchor, and a brake applying motor at each end of said shoe.

6. In mechanism of the class described, the combination of a brake drum, a support, hydraulic motors mounted on said support, a brake shoe connected to both of said motors, a second brake shoe connected to one of said motors, an adjustable anchor for said last-mentioned shoe, a pair of adjustable anchors for said first-mentioned shoe, one anchor of said pair being located closer to the center of the drum than the other anchor of said pair, guides for said shoes, and springs for withdrawing said shoes from contact with said drum.

7. In mechanism of the class described, the combination of a brake drum, a supporting pan, a pair of brake shoes for engagement with said drum, a pair of motors, each motor being connected to each shoe, an anchor for each shoe located adjacent the end of one of said motors, a second anchor for each shoe located beside one of said motors, guide means for said shoes, a pair of springs connecting said shoes, and an additional pair of springs connecting said shoes with said supporting pan.

8. A hydraulic brake comprising a rotatable drum, a relatively stationary support, a pair of hydraulic cylinders mounted on said support, a pair of pistons in each cylinder, a pair of brake shoes, each shoe being actuated by a pair of said pistons, a pair of anchors for each shoe, spaced radially different distances from the working face of each shoe, and means for holding said shoes against said anchors under resting conditions.

9. A hydraulic brake comprising a rotatable drum, a relatively stationary support, a pair of hydraulic cylinders mounted on said support, a pair of brake shoes, each shoe being actuated by each cylinder, a pair of anchors for each shoe spaced different distances from the perimeter of said shoes, and resilient means for holding said shoes out of contact with the drum, said means being more effective at the end of said shoes adjacent the anchor spaced the lesser of said distances.

10. A hydraulic brake comprising a rotatable drum, a relatively stationary support, a pair of hydraulic cylinders mounted on said support, a pair of pistons in each cylinder, a pair of brake shoes, each shoe being actuated by a pair of said pistons, and an anchor at each end of each shoe spaced different distances from the working faces of said shoes.

11. In mechanism of the class described, a brake drum, a support adjacent said drum, brake shoes for engagement with said drum, a pair of rigid anchors for each brake shoe carried by said support, one of each pair of anchors receiving the thrust of its shoe when said drum is rotating in one direction and another of each pair of anchors receiving the thrust of its shoe when said drum is rotating in the opposite direction, the anchors of each pair effective at different distances from the center of said drum, and means for applying said brake shoes against said drum.

12. In a brake mechanism, the combination of a drum, a brake shoe for engaging said drum, anchors for said shoe positioned different distances from the brake drum, means for resiliently holding said shoe against said anchors when said shoe is in its resting position, one of said anchors receiving the thrust load between said brake shoe and drum in one direction of rotation and another of said anchors receiving the thrust load between said brake shoe and drum in the opposite direction of rotation, actuators for moving said shoe outwardly radially, and means for normally predisposing contact between said shoe and that anchor positioned the lesser of said distances from said brake drum.

13. In a brake mechanism, the combination of a drum, a brake shoe for engaging said drum, a pair of anchors for said shoe permitting movement between said shoe and drum and positioned different distances from the face of said shoe, expansible means for actuating both ends of said brake shoe, and means for predisposing contact between said shoe and the anchor which is positioned the lesser of said distances.

14. In mechanism of the class described, the combination of a brake drum, a support, a pair of brake shoes adapted for engagement with said brake drum, and having two adjacent ends, a pair of rigid anchors for said adjacent ends of said shoes, the effective portion of one of said anchors being closer to the center of the brake drum than the effective portion of the other anchor, and a brake applying motor intermediate said adjacent ends.

15. A brake comprising a drum, support, a plurality of brake shoes disposed end to end and adapted for engagement with said drum, means between adjacent ends of said shoes for expanding said shoes against said drum, anchor means adjacent each end of said shoes spaced alternately different operative distances from said drum, and means for holding said shoes against said anchors under resting conditions.

WALLACE F. OLIVER.